Aug. 16, 1927.

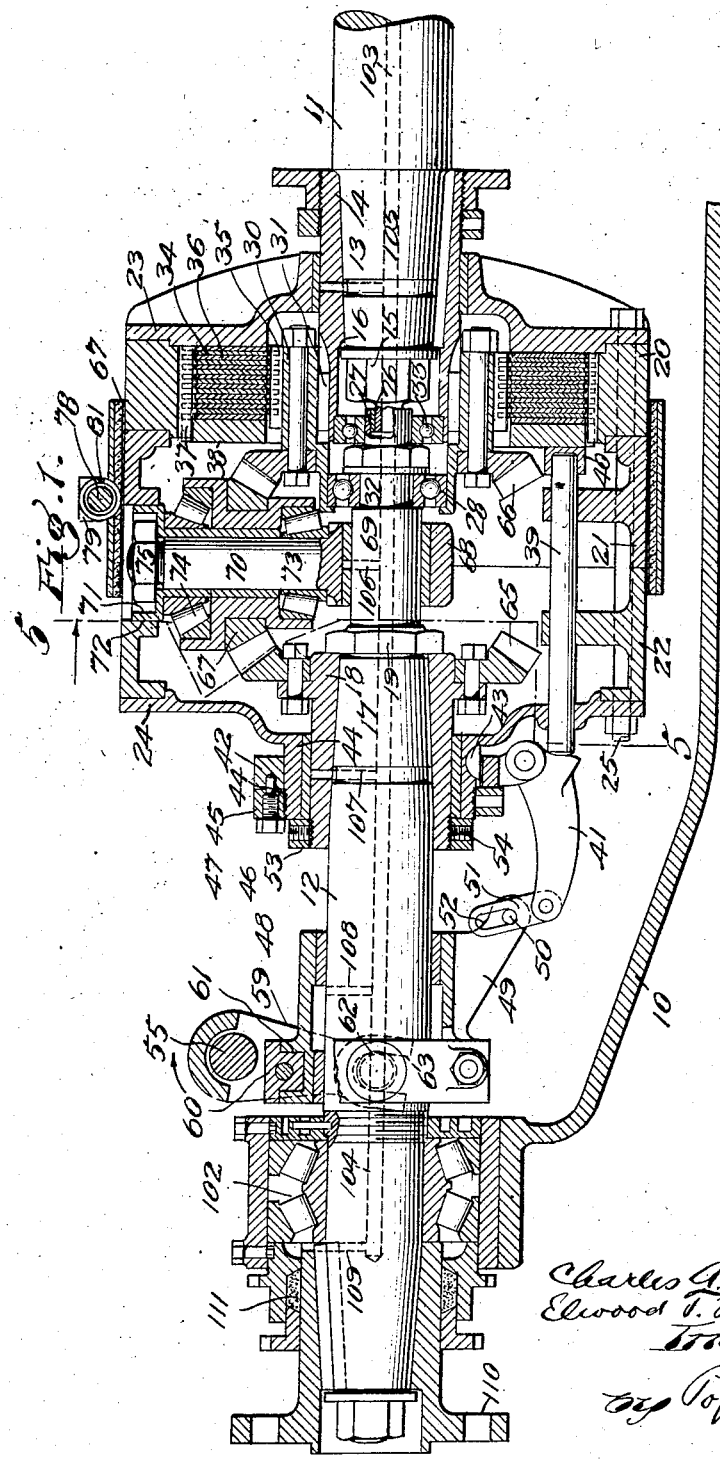

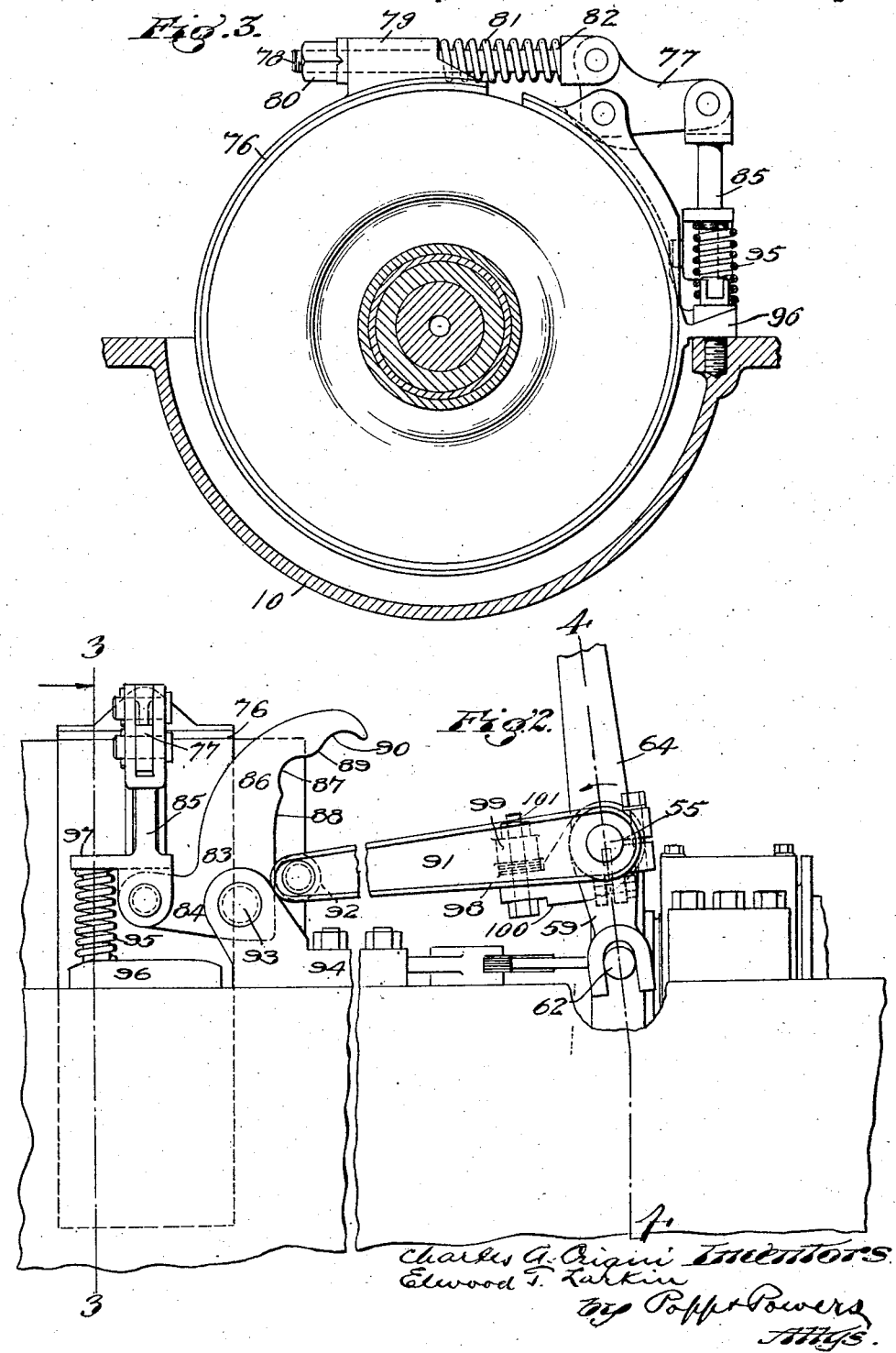

C. A. CRIQUI ET AL 1,639,259

POWER TRANSMISSION MECHANISM

Filed Sept. 19, 1925  3 Sheets-Sheet 3

Charles A. Criqui
Elwood T. Larkins
Inventors by Popp & Powers
Attys.

Patented Aug. 16, 1927.

1,639,259

UNITED STATES PATENT OFFICE.

CHARLES A. CRIQUI AND ELWOOD T. LARKIN, OF BUFFALO, NEW YORK; SAID LARKIN ASSIGNOR TO SAID CRIQUI.

POWER-TRANSMISSION MECHANISM.

Application filed September 19, 1925. Serial No. 57,347.

This invention relates to a mechanism for transmitting power from a driving shaft to a driven shaft so as to permit of operating the driving shaft independently of the driven shaft or to turn the driven shaft at the same speed or to turn the driven shaft backwardly at a lower speed, such transmission mechanism being more particularly intended for use in motor boats.

One of the objects of this invention is to provide a transmission of this character which is comparatively simple and compact and capable of being installed where little room is available.

Another object of this invention is to so construct the transmission mechanism that large powers can be safely transmitted at higher speeds.

A further object of this invention is to provide a transmission mechanism which employs gears of small diameter but having large bearing surfaces and low pitch velocity, thereby reducing the weight and loss in efficiency of the same to a minimum.

In the accompanying drawings:—

Fig. 1, is a longitudinal section of the preferred form of our improved clutch and reversing gear.

Fig. 2, is a fragmentary side elevation showing the mechanism for operating the clutch and reversing gear, the same being viewed in a direction opposite to that of Fig. 1.

Fig. 3, is a fragmentary transverse section on line 3—3 Fig. 2, but omitting the internal mechanism of the clutch and reversing gear.

Similar characters of reference indicate like parts throughout the several drawings.

Figure 4:
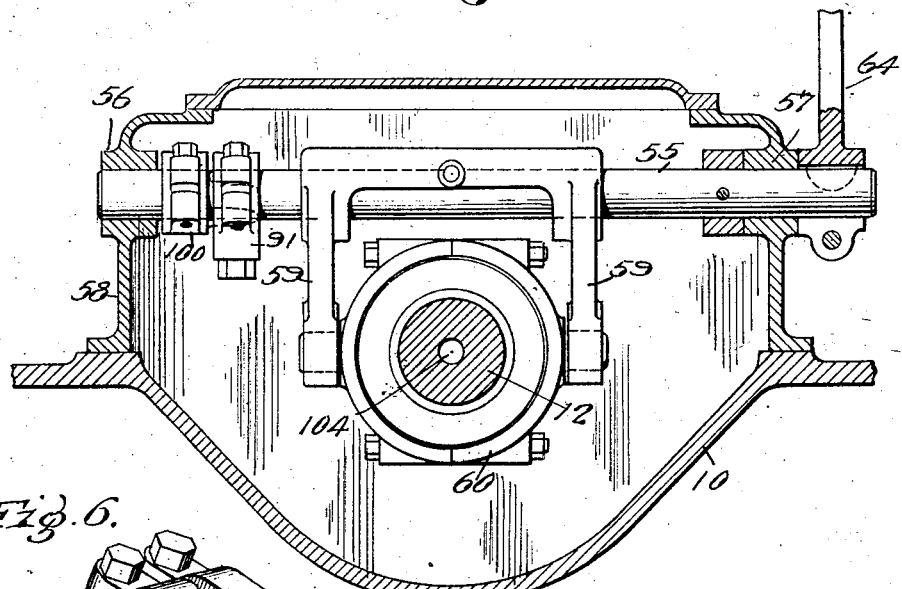
Fig. 4, is a cross section on line 4—4, Fig. 2, but showing the casing complete which encloses the adjacent parts of the clutch and reversing gear.
Figure 6:
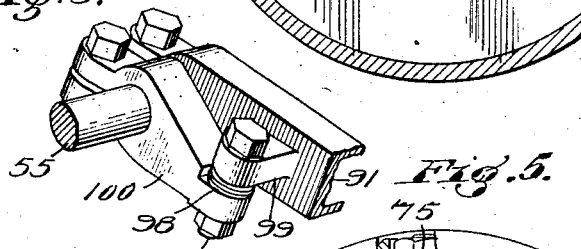
Fig. 6 is a fragmentary perspective view of the shifting mechanism.

The numeral 10 represents the foundation or main frame of the clutch and reversing gear which may be of any suitable construction, 11 the driving or crank shaft of the engine from which the power is derived and 12 the driven or tail shaft to which the power is transmitted and which is in turn connected in any suitable manner with the propeller shaft when this gearing is installed in a power boat. The driving and driven shafts are axially in line and to insure maintaining the same in this relative position centering means are provided which in the present instance consist of a centering pin 26 arranged at the rear end of the driving shaft and engaging with a socket 27 at the front end of the driven shaft, as shown in Fig. 1.

The driving and driven shafts are further maintained in alignment with each other by a pilot bearing 33 interposed between the rear end of the front bearing sleeve 14 and the front end of the driven shaft, as shown in Fig. 1. The rear part 13 of the driving shaft is preferably tapered and has mounted therein a bearing sleeve 14 which is held in place by a screw nut 15 on the shaft 11 and engaging a rearwardly facing internal shoulder 16 on the sleeve 14, and the front part 17 of the driven shaft is similarly tapered and has secured thereto a bearing sleeve 18 which is engaged at its front end by a screw nut 19 on the driven shaft for holding the sleeve 18 in place, as shown in Fig. 1.

Surrounding the opposing ends of the driving and driven shafts is a rotatable carrier or support which is preferably constructed in the form of an enclosing casing or drum and which for convenience in erection and dismantling preferably has a body composed of front, intermediate and rear ring shaped sections 20, 21, 22, a front head 23 engaging the front body section 20 and turning on the exterior of the bearing sleeve 14, a rear head 24 engaging with the rear body section 22 and having a rearwardly projecting neck 44, turning on the rear bearing sleeve 18, and a plurality of longitudinal bolts 25 for detachably connecting the several sections of the rotary supporting casing. The neck 44 abuts against an adjusting collar 53 having a screw connection 54 with the bearing sleeve 18.

Within the rotary casing is arranged a clutch for coupling or uncoupling the same with the driven shaft which clutch may be of any suitable construction but which in the preferred form shown in the drawings is constructed as follows:—

The numeral 30 represents a clutch sleeve mounted on the rear end of the front bearing sleeve 14 and connected therewith by a spline 31 so as to compel these sleeves to turn together but permitting the same to move lengthwise independently of each other and thus allowing end movement of the driving or crank shaft without interfering with the clutch and the reversing gear. Between this clutch sleeve and a reduced neck 32 on the front part of the driven shaft is a thrust bearing 28 which centers these parts relatively to each other and also forms a thrust bearing for the driving clutch members which are operatively connected with the driving shaft. These driving clutch members consist of a plurality of friction plates or disks 34 which are arranged side by side lengthwise of the periphery of the clutch sleeve and are connected with the latter by splines 35 so as to compel these friction plates to turn with the driving shaft and still move lengthwise thereof.

Figure 5:
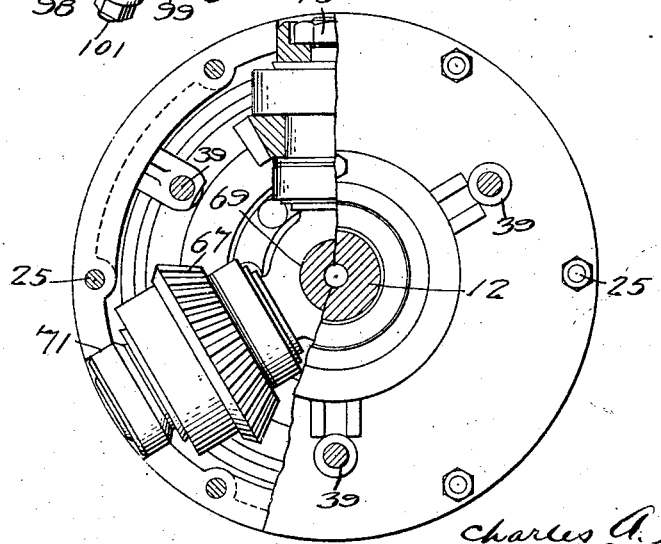
Fig. 5 is a vertical cross section taken on line 5—5, Fig. 1.

Intercalated with the driving friction plates is a longitudinal row of driven friction plates or disks 36 which are connected by splines 37 with the bore of the front section 20 of the rotary casing so as to compel the same to turn together but permitting these plates to move lengthwise independent thereof, as shown in Fig. 1. Upon pressing the two groups of friction plates together lengthwise of the gear the same will grip each other and cause the rotary motion of the driving shaft to be transmitted to the rotary casing but when lengthwise pressure on these plates is released the same relax out of friction engagement and are uncoupled so that motion will not be transmitted from the driving shaft to the rotary casing. The means for operating the friction plates of the clutch for coupling and uncoupling the same preferably comprise a presser ring 38 engaging the rearmost friction plate, a plurality of longitudinally movable presser rods 39 guided within the rear part of the rotary casing and bearing at their front ends by means of heads 40 against the rear side of said presser ring, and a plurality of cam levers 41 mounted on the rear part of the rotary casing and engaging with the rear ends of the presser rods, as shown in Figs. 1 and 5. The several cam levers are arranged in an annular row around the longitudinal axis of the gear and are pivotally mounted at their front ends on a supporting ring 42 which is connected by a spline 43 with the tubular neck 44 on the rear end of the rotary casing. This supporting ring abuts with its rear side against a thrust ring 45 which has a screw connection 46 with the neck 44 so as to permit of adjusting the same lengthwise thereon and thereby shift the fulcrum of the cam levers in order to secure the desired action of the same for coupling and uncoupling the friction plates of the clutch.

After adjustment of the thrust ring the same is held in place by a locking screw 47 thereon engaging with the cam lever supporting ring, as shown in Fig. 1.

The cam levers are operated simultaneously by means which comprise a shifting sleeve 48 movable lengthwise on the central part of the driven shaft and provided on its front end with a plurality of lugs 49 each of which has pins 50, a link 51 pivoted at its outer end to each of the cam levers and provided at its inner end with a longitudinal slot 52 which receives one of said pins 50, a horizontal control or rock shaft 55 arranged transversely above the sleeve 48 and journaled at its opposite ends in bearings 56, 57 in the upper part 58 of the enclosing housing, rock arms 59 depending from said rock shaft on opposite sides of said shifting sleeve 48, a shifting ring 60 arranged in an annular groove 61 in the shifting sleeve and provided with laterally projecting pins 62 engaging with slots 63 in the ends of said rock arms, and a hand or controlling lever 64 projecting upwardly from one end of said rock shaft outside of the housing section 58 and adapted to be manipulated by the operator for opening and closing the clutch and also for causing the driven shaft to either turn forwardly with the driving shaft or to turn backwardly relatively thereto, as will be described further on. Upon turning the rock shaft 55 in the direction of the arrow in Figs. 1 and 2 the pins 50 engage the outer ends of the slots in the links 51 and turn the cam levers outwardly thereby pushing the shifting rods forwardly and causing the friction plates to grip each other and transmit rotary motion from the driving shaft to the rotary casing. Upon moving the hand lever 64 backwardly into its neutral or central position the links 51 will be swung forwardly and the pins 50 will move into the inner parts of the slot 52 thereby permitting the cam levers to relax inwardly and the pressure of the friction plates against each other to be relieved so that they are uncoupled.

Upon the opposing inner ends of the clutch sleeve 30 and the rear bearing sleeve 18 are mounted front and rear bevel gear wheels 65, 66, and motion is transmitted from the front driving gear wheels 65 to the rear driven gear wheel 66 by a planetary gearing consisting preferably of three intermediate bevel gear wheels 67 which are arranged in an annular row between the driving and driven gear wheels and each of which meshes on its opposite sides with the same and is pivotally mounted so as to be capable of either turning about an axis on a line radiating from the axis of the driving and driven shafts or turning bodily with the rotary casing or carrier about the axis of said driving and driven shafts for causing the driven shaft to either turn with the driving shaft or in a direction opposite thereto. The preferred means for thus mounting the intermediate or planetary gear pinions for this purpose consists of a central supporting ring 68 rotatably mounted on a cylindrical shank or arbor 69 formed on the driven shaft between its reduced neck and tapering part, three pivot arms 70 radiating from said ring toward the body of the carrier, supporting sleeves 71 surrounding the outer parts of said pivot arms and seated in openings 72 on the adjacent parts of the periphery of the carrier, and conical roller bearings 73, 74, interposed between the hubs of the planetary gear pinions and the pivot arms and the sleeves thereon. The sleeves may be moved inwardly on the pivot arms by screw nuts 75 on the arms engaging the outer ends of the sleeves, thereby adjusting these bearings to take up wear.

Means are provided for holding the rotary carrier against turning so as to cause the intermediate pinions to transmit motion from the driving to the driven gear wheel. The preferred means for this purpose comprise a split brake band 76 encircling the periphery of the rotary carrier and held against circumferential movement by a lug 96 thereon connected with the adjacent stationary part of the frame, an elbow shaped tightening lever 77 pivoted on one end of the brake band, a tightening rod 78 pivotally connected with the inner arm of the tightening lever and passing through an eye or perforated lug 79 on the other end of said brake band, a screw nut 80 arranged on the tightening rod and bearing against the outer side of said lug, and a spring 81 surrounding said tightening lever and bearing with one end against said lug and with its opposite end against a shoulder 82 on said rod Upon moving the outer arm of said tightening lever downwardly the brake band will be contracted and grip the carrier so as to prevent its rotation while upon releasing the tightening lever the spring 81 will expand the brake band and release the carrier so that it is free to rotate.

In the neutral condition of the parts of this clutch and reversing gear the clutch is uncoupled and the brake band is released. If the driving shaft is rotating at this time the driving gear wheel 65 which is operatively connected therewith will turn the intermediate pinions and cause the same to roll on the driven gear wheel 66 which at this time is stationary by reason of the fact that the load of the same, such as the propeller in the water which resists its turning causes the carrier to turn forwardly, slowly and idly without transmitting power from the driving to the driven shaft. If it is desired to turn the driven shaft forwardly with the driving shaft the operator manipulates the hand lever 64 so as to close the clutch whereby the carrier is locked against rotation independently of the driving shaft and is compelled to rotate forwardly in unison therewith. The instant this occurs the intermediate pinions cease rotating about their individual axes and serve as keys which lock the driving and driven gear wheels together so that the same together with the carrier rotate as one common mass, whereby power of the engine is transmitted directly from the driving to the driven shaft and these shafts turn forwardly at the same speed. Should it now become desirable to reverse the direction of rotation of the driven shaft, as for example, in a motor boat, the operator releases or uncouples the clutch and tightens the brake band around the carrier so as to hold the latter against turning. When this occurs rotary forward motion of the driving gear wheel which turns with the driving shaft causes the intermediate gear pinions to turn about their individual axes which latter at this time are fixed, thereby causing the driven gear wheel which engages with the opposite side of the pinions to be turned in the reverse direction together with the driven shaft and the parts associated therewith.

Means are provided for holding the hand or controlling lever in a neutral position and causing the motion of the driving shaft to be transmitted in the same direction to the driven shaft upon moving the hand or controlling lever away from one side of its neutral position and causing the motion of the driving shaft to be transmitted in a reverse direction to the driven shaft upon moving the hand lever in the opposite direction. The preferred form of the means for accomplishing this purpose are constructed as follows:—

The numeral 83 represents a vertically swinging cam lever which has a horizontal lower arm 84 connected by an upright link 85 with the outer arm of the tightening lever 77 and an upwardly projecting cam arm 86 which is provided on its face with a central or neutral notch 87, a dwell 88 below said neutral notch, a reverse cam 89 above the neutral notch and a reverse locking notch 90 above the reverse cam, as shown in Fig. 2. On that end of the rocking control shaft 55 opposite to the hand lever 64 this shaft is provided with a forwardly projecting operating arm 91 which carries a roller 92 at its front end for engagement with the cam of the cam lever 83. The latter tends constantly to swing in the direction for moving its cam arm forwardly, this purpose being served by mounting this lever by means of a horizontal pivot 93 on a bracket 94 which is secured to the adjacent stationary part of the main frame, and interposing an expansion spring 95 between the lug 96 on the main frame and a tail or shoulder 97 on the lower part of the link 85.

When the hand lever 64 is in its neutral position and no power is being transmitted from the driving to the driven shaft the operating arm engages its roller with the neutral notch 87 in which position the same is yieldingly retained by the tension of the spring 95. Upon moving the hand lever forwardly and depressing the operating arm the latter is forced out of the neutral notch 87 and into engagement with the lower dwell 88 whereby the brake band is not tightened on the carrier but the clutch is closed or coupled and causes power in a forward direction to be transmitted from the driving to the driven shaft. Upon, however, moving the operating arm from the neutral notch 87 over the cam face 89 and into engagement with the reverse locking notch 90 the clutch will be held open and the brake band will be tightened on the carrier so as to hold the same against turning and thereby cause motion which is received from the driving shaft to be reversed upon being transmitted to the driven shaft.

In order to permit of conveniently adjusting the relation of the clutch and the brake so as to ensure proper timing of the forward and reverse operations of this clutch and reversing gear mechanism, means are provided which consist of one or more shims 98 arranged between an adjusting lug 99 on the operating arm 91 and an adjusting arm 100 secured to the rocking controlling shaft 55, and a bolt 101 passing through said shims and the adjusting lug and arm and connecting the same. The operating arm 91 is loose on the rock shaft but the adjusting arm is clamped tight thereon and by varying the number of shims between the lug 99 and arm 100 the position of the arm 91 relative to the cam arm 86 may be adjusted to secure the proper timing of the parts.

Adjacent to its rear end the tail or driven shaft is supported on the foundation by a combined radial and thrust bearing 102 so as to properly support this shaft against lateral movement but also enable the same to resist any endwise thrust to which the same may be subjected while in use and thereby avoid disturbing the clutch and reversing gearing between the driving and driven shafts.

For convenience in lubricating the principal bearings of this clutch and reversing gear registering main oil conduits 103, 104 are formed lengthwise in the driving and driven shafts, and branch ducts 105, 106, 107, 108 and 109 are extended laterally from these main conduits to the surfaces of the front bearing 14, the rotary collar or ring 68 of the planetary gearing, the rear bearing 18, the clutch sleeve 48 and the rear radial and thrust bearing 102, oil being applied to these conduits from the same source which supplies the remaining parts of the engine. At its rear end the driven shaft has a flanged sleeve 110 for connecting the same with the propeller shaft or other part to be driven and around said sleeve a stuffing box 111 is provided to prevent the escape of oil to the exterior of the engine casing.

By employing a spline 31 between the clutch sleeve and the bearing sleeve 14 on the driving or crank shaft the latter is relieved from any thrust loads exerted by the propellers.

The principal advantage derived from this construction is that the same enables heavier powers to be transmitted at considerably higher speeds than has been heretofore regarded as possible with safety. This is largely due to the possibility of using small diameter pinions or gears, large capacity bearings, low pitch velocity, and very small space requirement. The entire transmission can be made of large capacity and capable of operating at high speed with very little loss in efficiency and it is possible to install the gear where only a compartively small space is available and a comparatively light weight is specially desirable.

This gear has a higher efficiency than clutch and reversing gears heretofore known, and the several parts are of simple construction and easy to assemble and dismember when necessary.

We claim as our invention:—

1. A mechanism for transmitting power from a driving shaft to a driven shaft, comprising bearing sleeves secured to the opposing ends of said shafts, a bearing interposed between the front of the driven shaft and said front bearing sleeve, a rotary carrier journaled on said bearing sleeves, a coupling sleeve splined on said front bearing sleeve, driving and driven gear wheels mounted on said coupling sleeve and said rear bearing sleeve, respectively, so as to turn therewith, a rotary carrier journaled on said bearing sleeves, a clutch for connecting and disconnecting said coupling sleeve and carrier, and an intermediate gear pinion pivotally mounted on said carrier and meshing with said driving and driven gear wheels.

2. A mechanism for transmitting power from a driving shaft to a driven shaft, comprising bearing sleeves secured to the opposing ends of said shafts, a bearing interposed between the front of the driven shaft and said front bearing sleeve, a rotary carrier journaled on said bearing sleeves, a coupling sleeve splined on said front bearing sleeve, driving and driven gear wheels mounted on said coupling sleeve and said rear bearing sleeve, respectively, so as to turn therewith, a rotary carrier journaled on said bearing sleeves, a clutch for connecting and disconnecting said coupling sleeve and carrier, an intermediate gear pinion pivotally mounted on said carrier and meshing with said driving and driven gear wheels and a centering bearing interposed between said coupling sleeve and said driven shaft.

3. A mechanism for transmitting power from a driving shaft to a driven shaft, comprising driving and driven gear wheels mounted on said driving and driven shafts to turn therewith, respectively, a drum shaped carrier rotatable about the axis of said shafts, an intermediate gear pinion pivotally mounted on said carrier and meshing with said driving and driven gear wheels, a clutch for connecting and disconnecting said driving shaft and carrier, and means for holding said carrier against turning or releasing the same comprising a split brake band surrounding said carrier and connected with a stationary part, a tightening lever pivoted on one end of the brake band, a tightening rod connecting said tightening lever with the other end of said brake band, a cam lever connected with said tightening lever and having its cam face provided with a neutral notch, a dwell on one side of the neutral notch and a cam face on the opposite side of said notch, and an operating lever engaging with the face of said cam lever.

4. A mechanism for transmitting power from a driving shaft to a driven shaft, comprising driving and driven gear wheels mounted on said driving and driven shafts to turn therewith, respectively, a drum shaped carrier rotatable about the axis of said shafts, an intermediate gear pinion pivotally mounted on said carrier and meshing with said driving and driven gear wheels, a clutch for connecting and disconnecting said driving shaft and carrier, and means for holding said carrier against turning or releasing the same comprising a split brake band surrounding said carrier and connected with a stationary part, a tightening lever pivoted on one end of the brake band, a tightening rod connecting said tightening lever with the other end of said brake band, an elbow shaped cam lever having a lower shifting arm and an upper cam arm, a link connecting said lower arm with said tightening lever and provided with a shoulder, a spring bearing against said shoulder, and an operating lever engaging with said cam face.

CHARLES A. CRIQUI.
ELWOOD T. LARKIN.